(12) United States Patent
Kim et al.

(10) Patent No.: US 10,236,536 B2
(45) Date of Patent: Mar. 19, 2019

(54) SECONDARY BATTERY INCLUDING ELECTROLYTE STORAGE PORTION

(71) Applicant: Samsung Electronics Co., Ltd., Suwon-si, Gyeonggi-do (KR)

(72) Inventors: Jaeeun Kim, Hwaseong-si (KR); Jirae Kim, Seoul (KR); Hyorang Kang, Anyang-si (KR); Wonseok Chang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 221 days.

(21) Appl. No.: 15/132,626

(22) Filed: Apr. 19, 2016

(65) Prior Publication Data
US 2016/0372797 A1    Dec. 22, 2016

(30) Foreign Application Priority Data
Jun. 22, 2015    (KR) .................. 10-2015-0088725

(51) Int. Cl.
| | |
|---|---|
| *H02J 7/00* | (2006.01) |
| *H01M 10/42* | (2006.01) |
| *H01M 10/0569* | (2010.01) |
| *H01M 10/0568* | (2010.01) |
| *H01M 2/02* | (2006.01) |
| *H01M 10/04* | (2006.01) |
| *H01M 10/052* | (2010.01) |
| *H01M 10/0585* | (2010.01) |

(52) U.S. Cl.
CPC ....... *H01M 10/4214* (2013.01); *H01M 2/024* (2013.01); *H01M 2/0207* (2013.01); *H01M 10/0413* (2013.01); *H01M 10/0436* (2013.01); *H01M 10/052* (2013.01); *H01M 10/0568* (2013.01); *H01M 10/0569* (2013.01); *H01M 10/0585* (2013.01); *H01M 2300/0025* (2013.01)

(58) Field of Classification Search
CPC .......... H01M 10/4214; H01M 2/0207; H01M 2/024; H01M 10/0413; H01M 10/0436; H01M 10/052; H01M 10/0568; H01M 10/0569; H01M 10/0585; H01M 2300/0025; H02J 7/0042
USPC ......................................................... 320/128
See application file for complete search history.

(56) References Cited

U.S. PATENT DOCUMENTS

| | | | |
|---|---|---|---|
| 7,488,547 B1 * | 2/2009 | Iacovelli | H01M 4/8626 |
| | | | 429/434 |
| 2005/0164077 A1 | 7/2005 | Bacon | |
| 2006/0199067 A1 | 9/2006 | Barbir et al. | |
| 2012/0301753 A1 * | 11/2012 | Chen | H01M 2/38 |
| | | | 429/48 |

(Continued)

FOREIGN PATENT DOCUMENTS

| | | | |
|---|---|---|---|
| KR | 100614394 B1 | 8/2006 | |
| KR | 101313070 B1 | 9/2013 | |

*Primary Examiner* — Nathaniel Pelton
(74) *Attorney, Agent, or Firm* — Cantor Colburn LLP (57) ABSTRACT

A secondary battery including: an electrode assembly including a first electrode, a second electrode, and a separator interposed between the first electrode and the second electrode; and an accommodation portion, wherein the electrode assembly is disposed in the accommodation portion, and wherein a semipermeable electrolyte solution storage portion is adjacent to the electrode assembly in an upper end or a lower end of the accommodation portion.

19 Claims, 4 Drawing Sheets

(56) References Cited

U.S. PATENT DOCUMENTS

| | | | |
|---|---|---|---|
| 2013/0011704 A1* | 1/2013 | Horne | B60L 11/1824 |
| | | | 429/72 |
| 2013/0187618 A1* | 7/2013 | Suppes | H01M 2/38 |
| | | | 320/137 |
| 2013/0302650 A1* | 11/2013 | Delangis | G21H 1/00 |
| | | | 429/5 |
| 2014/0045005 A1 | 2/2014 | Schumann et al. | |
| 2014/0093760 A1 | 4/2014 | Hermann et al. | |
| 2015/0037617 A1* | 2/2015 | Cabiri | H01M 2/0285 |
| | | | 429/7 |
| 2015/0307659 A1* | 10/2015 | Hong | C08G 61/10 |
| | | | 429/492 |

* cited by examiner

SECONDARY BATTERY INCLUDING ELECTROLYTE STORAGE PORTION

CROSS-REFERENCE TO RELATED APPLICATION

This application claims priority to and the benefit of Korean Patent Application No. 10-2015-0088725, filed on Jun. 22, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a secondary battery.

2. Description of the Related Art

Secondary batteries are capable of charging and discharging. A secondary battery may be used as a single cell or used in a module in which single cells are connected to each other, depending on the type of external device.

In a secondary battery, an electrode can experience a volume change while charging and discharging the secondary battery for a long time. For example, the volume change of a negative electrode may be significant, and electrolyte may be depleted due to a side reaction of the electrode and the electrolyte.

Therefore, there is a need for improvement in suppressing the volume change of the electrode and in the continuous supply or supplement of an electrolyte solution.

SUMMARY

Described herein is a secondary battery that may prevent volume changes of an electrode and continuously provide an electrolyte solution.

According to an aspect, a secondary battery includes: an electrode assembly including a first electrode, a second electrode, and a separator interposed between the first electrode and the second electrode; and a case including an accommodation portion, wherein the electrode assembly is disposed in the accommodation portion, and wherein a semipermeable electrolyte solution storage portion is adjacent to the electrode assembly in an upper end or a lower end of the accommodation portion.

Also disclosed is a method of operating a secondary battery including an electrode assembly and including a first electrode, a second electrode, and a separator interposed between the first electrode and the second electrode, an electrolyte disposed in the electrode assembly, and a case including an accommodation portion, wherein the electrode assembly is disposed in the accommodation portion, and wherein a semipermeable electrolyte solution storage portion is adjacent to the electrode assembly in an upper end or a lower end of the accommodation portion, the method including: charging the secondary battery, wherein, when charging the secondary battery, an internal pressure of the semipermeable electrolyte solution storage portion is greater than an osmotic pressure of the semipermeable electrolyte solution storage portion, and wherein the electrolyte solution flows out of the semipermeable electrolyte solution storage portion during the charging.

Also disclosed is a method of manufacturing a secondary battery, the method including: disposing an electrode assembly in a case including an accommodating portion, wherein the electrode assembly includes a first electrode, a second electrode, and a separator interposed between the first electrode and the second electrode; and disposing a semipermeable electrolyte solution storage portion adjacent to the electrode assembly in an upper end or a lower end of the accommodation portion to manufacture the secondary battery.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present inventive concept.

It will be understood that when an element is referred to as being "on" or "adjacent to" another element, it can be directly on or adjacent to the other element or intervening elements may be present therebetween. In contrast, when an element is referred to as being "directly on" or "directly adjacent to" another element, there are no intervening elements present.

It will be understood that, although the terms "first," "second," "third," etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter a secondary battery according to an exemplary embodiment will be described with reference to the attached drawings. However, these are for illustrative purposes only and are not intended to limit the scope of the disclosure.

Figure 1:
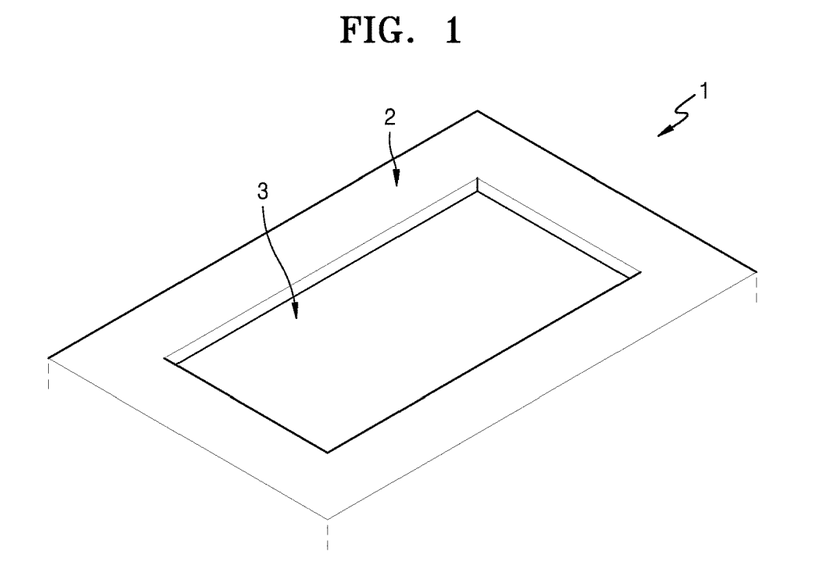
FIG. 1 illustrates a cross-sectional view of a case and an accommodation portion 3.

FIG. 1 illustrates a cross-sectional view of a case having an accommodation portion. An electrode assembly is disposed in the accommodation portion of the case to provide a secondary battery according to an exemplary embodiment.

Referring to FIG. 1, the accommodation portion 3, which accommodates an electrode assembly, is formed as a recess in a portion of the case. In FIG. 1, only a part of the case 1 is illustrated for convenience. However, the case comprises a first part of the case 1 and another part of the case (not shown) integrally bonded along the edge of the case 2, so as to seal the electrode assembly disposed in the accommodation portion 3. The other part of the case (not shown) may also have a recess as an accommodation portion having the same size and shape as in first part of the case 1.

The case, which is comprised of the first part of the case 1 and the other part of the case (not shown), may be manufactured in a pouch shape or a rectangular shape. For example, the case may be in a pouch shape. The pouch shape case may include a multi-layered structure including a heat welding layer serving as a sealing material capable of heat welding, a metal layer, e.g., an aluminum layer, serving as a barrier between water and oxygen while maintaining mechanical strength, and an insulating layer. The heat welding layer may be formed on the inner surface of the metal layer, and the insulating layer may be formed on the outer surface of the metal layer. If desired, the pouch shape case may have properties of ductility.

Figure 2:
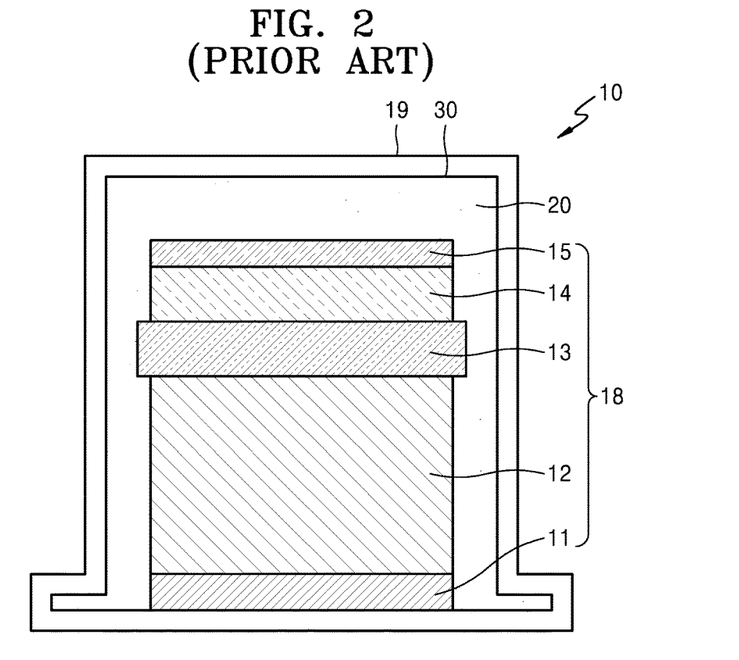
FIG. 2 illustrates a cross-sectional view of a prior art secondary battery.

FIG. 2 illustrates a cross-sectional view of a prior art secondary battery.

Referring to FIG. 2, the prior art secondary battery 10 may include first electrodes 11 and 12, second electrodes 14 and 15, an electrode assembly 18 including a separator 13 interposed between the first electrodes 11 and 12 and the second electrodes 14 and 15, and a case 19 in which an accommodation portion 30 is formed as a recess, in which the electrode assembly 18 is disposed. The accommodation portion 30 may further comprise a space 20.

The electrode assembly 18 may be a stacked structure including the first electrodes 11 and 12, the second electrodes 14 and 15, and the separator 13 interposed between the first electrodes 11 and 12 and the second electrodes 14 and 15. The electrode assembly 18 may be a stacked structure, or several, or several tens of stacked structures including first electrodes 11 and 12, the separator 13, and the second electrodes 14 and 15, which are stacked in this stated order. The accommodation portion 30 may include an electrolyte solution therein aside from the electrode assembly 18. If desired, the accommodation portion 30 may also include a reinforcement membrane (not shown).

The secondary battery 10, during charging and discharging, may go through volume changes of the first electrodes 11 and 12 or the second electrodes 14 and 15. For example, the volume of the second electrode 14 and 15 may repeatedly increase or decrease. As the number of cycles increases, the volume of the second electrodes 14 and 15 may gradually increase, and may not return to their original volume. Accordingly, the capacity of the secondary battery 10 may decrease during charging and discharging, decreasing lifespan characteristics.

When the secondary battery 10 is continually subject to charging and discharging for a long term, the electrolyte solution may deplete due to side reactions between the first electrodes 11 and 12 or the second electrodes 14 and 15 and the electrolyte solution. Hence, the capacity and lifespan characteristics of the secondary battery 10 may decrease, and or the secondary battery 10 may suffer permanent failure.

The secondary battery according to an embodiment may include a semipermeable electrolyte solution storage portion in an upper end or a lower end of the accommodation portion which houses the electrode assembly.

As used herein, the term "semipermeable" may mean a property of allowing a solvent to pass therethrough while blocking a solute to pass therethrough, without reacting with the solute.

As used herein, the "semipermeable electrolyte solution storage portion" may allow an electrolyte solution (particularly, an organic solvent included in an electrolyte solution) to flow in or flow out of the semipermeable electrolyte solution storage portion due to osmotic pressure.

Figure 4:
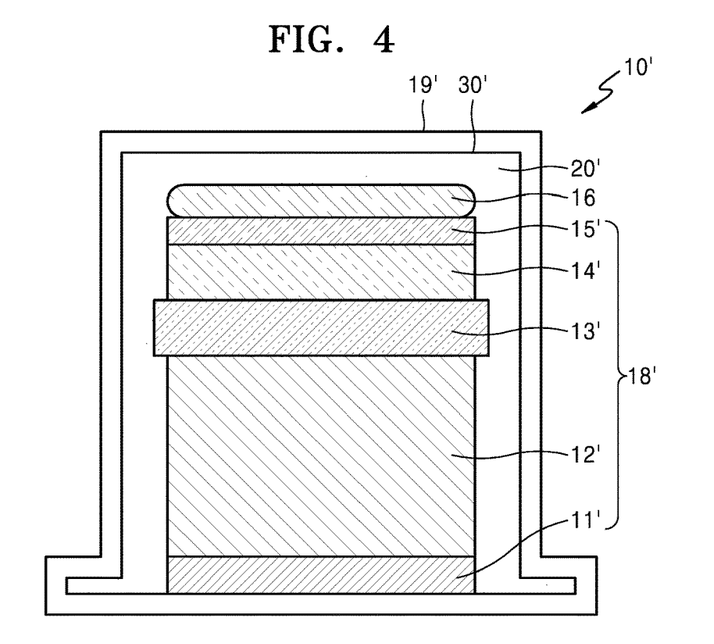
FIG. 4 illustrates a cross-sectional view of a secondary battery including a semipermeable electrolyte solution storage portion.

FIG. 4 illustrates a cross-sectional view of a secondary battery including the semipermeable electrolyte solution storage portion according to an embodiment.

Referring to FIG. 4, the secondary battery 10' may include an electrode assembly 18' including first electrodes 11' and 12', second electrodes 14' and 15', and a separator 13' interposed between the first electrodes 11' and 12' and the second electrodes 14' and 15', and a case 19' in which an accommodation portion 30' is formed as a recess, which houses the electrode assembly 18', wherein the electrode assembly 18 includes a semipermeable electrolyte solution storage portion 16 in an upper end of the accommodation portion 30' accommodating the electrode assembly 18'. If desired, an electrolyte solution, which may be the same as the electrolyte solution included in the semipermeable electrolyte solution storage portion 16, may be included in a space 20' between the accommodation portion 30' and the electrode assembly 18'.

Figure 3:
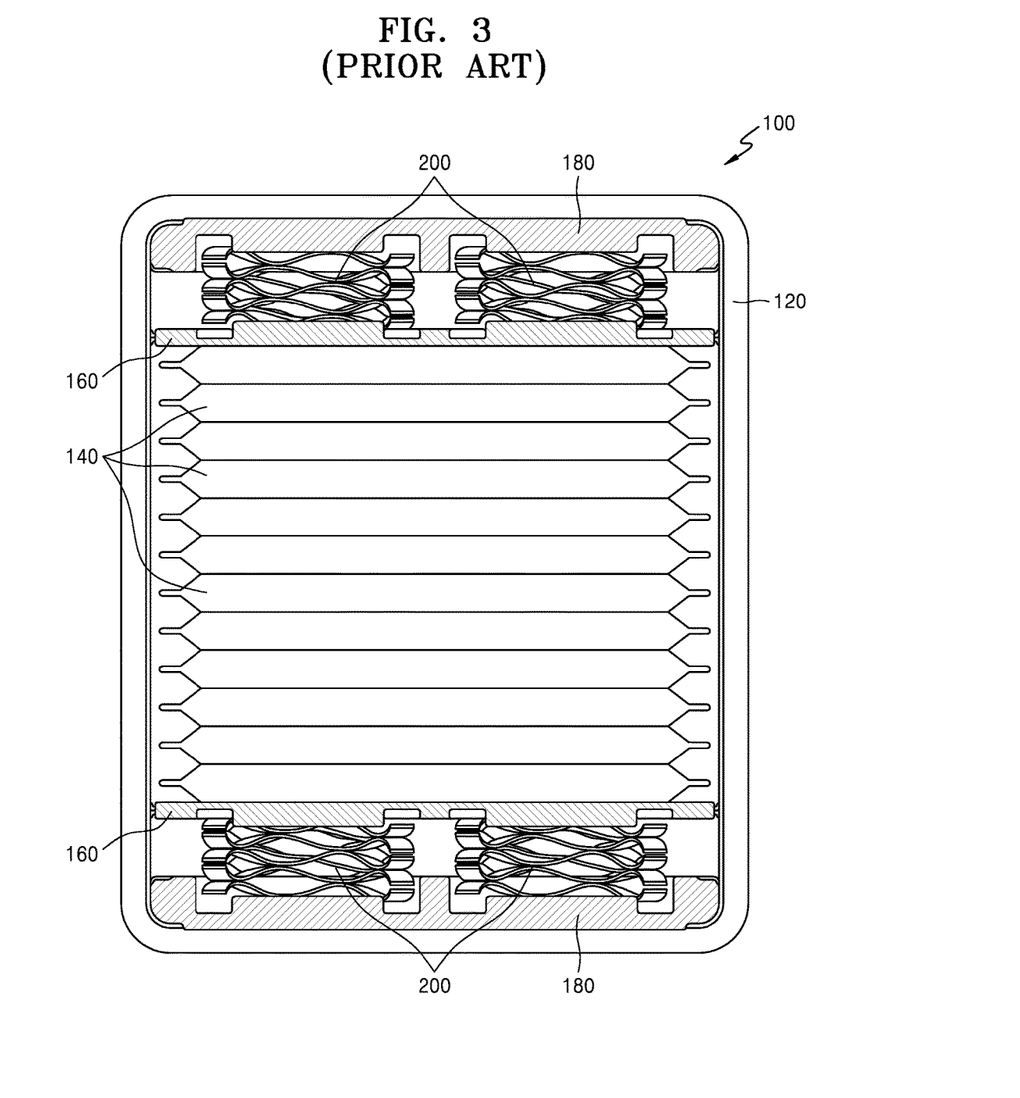
FIG. 3 illustrates a cross-sectional view of an electrochemical apparatus in which a case may individually include a pressure plate and a back plate in an upper end of the case and a lower end of the case wherein coil springs are disposed between the pressure plate and the back plate.

FIG. 3 illustrates a cross-sectional view of an electrochemical apparatus in which the case individually may include a pressure plate and a back plate in an upper end of the case and in a lower end of the case, wherein coil springs are disposed between the pressure plate and the back plate.

Referring to FIG. 3, the electrochemical apparatus 100 may constitute a battery by stacking a plurality of electrochemical cells 140 in the case 120. The pressure plates 160 and the back plates 180 are each included in the space between the case 120 and the electrochemical cell 140, that is, the upper end and the lower end of the case 120, respectively, and the four coil springs 200 are included between the pressure plate 160 and the back plate 180.

The pressure plate 160 may serve to provide a uniform compressive force on the plurality of electrochemical cells 140 during repeated charging and discharging in order to prevent electrodes in the plurality of electrochemical cells 140 from volume expansion, and the coil springs 200 may serve to assist the compressive force. However, the pressure plate 160, the back plate 180, and the coil springs 200 may occupy much space in the case 120, thus decreasing an energy density of the electrochemical apparatus 100. Further, repeated charging and discharging may cause abrasion of the pressure plate 160, the back plate 180, and the coil springs 200, thus gradually decreasing the compressive force on the stacked plurality of electrochemical cells 140.

The semipermeable electrolyte solution storage portion 16 may have a thickness of about 5% to about 10%, based on the total thickness of the secondary battery 10'.

The thickness of the secondary battery 10' may be several hundreds of micrometers (μm). The thickness of the semipermeable electrolyte solution storage portion 16 may be, for example, in a range of about 100 μm to about 500 μm, or, for example, in a range of about 50 μm to about 100 μm. When the thickness of the semipermeable electrolyte solution storage portion 16 is within these ranges, the semipermeable electrolyte solution storage portion 16 may prevent volume expansion of the second electrodes 14' and 15' in the case 19' due to repeated charging and discharging while applying a compressive force. Furthermore, it is easy to handle continuous volume change due to an inflow of the electrolyte solution (particularly, the organic solvent included in the electrolyte solution) to the semipermeable electrolyte solution storage portion 16 and outflow of the electrolyte solution (particularly, the organic solvent included in the electrolyte solution) from the semipermeable electrolyte solution storage portion 16. In addition, since the semipermeable electrolyte solution storage portion 16 is thin and occupies a small space in the secondary battery 10', the secondary battery 10' including the semipermeable electrolyte solution storage portion 16 may have similar capacity and lifespan characteristics with the secondary battery 10 not including the semipermeable electrolyte solution storage portion 16 as shown in FIG. 2.

The semipermeable electrolyte solution storage portion 16 may include a pore. The pore may have a molecular weight of cutoff (MWCO) in a range of about 300 Daltons to about 5,000 Daltons, about 500 Daltons to about 4,000 Daltons, or about 700 Daltons to about 3,000 Daltons. MWCO means the lowest molecular weight of a molecule that may be cut off or separated.

The semipermeable electrolyte solution storage portion 16 may include a polymeric material including at least one polymer selected from polystyrene (PS), polysulfone (PSF), polyvinylidene difluoride (PVdF), polyacrylonitrile (PAN), polycarbonate (PC), polytetrafluoroethylene (PTFE), and a copolymer thereof. The polymeric material may provide improved separation performance and provide improved mechanical strength.

The semipermeable electrolyte solution storage portion 16 may have any suitable shape and may be, for example, in a pouch shape.

The semipermeable electrolyte solution storage portion 16 may be prepared in a pouch shape by forming a support layer and/or an active layer on a porous support using the polymer material. In some embodiments, the semipermeable electrolyte solution storage portion 16 may be prepared in a pouch shape by forming a support layer and/or an active layer on a porous support using the polymer material and an additional protective layer on the support layer and/or active layer.

In some embodiments, the porous support may be, for example, a woven fabric or a nonwoven fabric, but embodiments are not limited thereto, and any suitable porous support may be used.

The method of forming the support layer and/or the active layer is not particularly limited, and any suitable method of forming a polymer material layer may be used. For example, an interfacial polymerization method, a phase separation method, or a thin film coating method may be used.

The protective layer may be formed on the support layer and/or the active layer by using an aqueous solution including polyvinyl pyrrolidone. The method of forming the protective layer is not particularly limited, and any suitable method of forming a protective layer may be used. For example, the methods of forming the protective layer known in the art e.g., dipping, coating, spraying, and surface coating may be carried out.

The semipermeable electrolyte solution storage portion 16 may include an alkali metal salt or an alkaline earth metal salt, and an organic solvent therein.

The alkali metal salt or the alkaline earth metallic salt may be at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, LiSbF$_6$, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, LiN(CF$_3$SO$_2$)$_2$, LiPF$_3$(CF$_2$CF$_3$)$_3$, LiPF$_3$(C$_2$F$_5$)$_3$, LiPF$_3$(CF$_3$)$_3$, LiB(C$_2$O$_4$)$_2$, NaSCN, NaSO$_3$CF$_3$, K[N(SO$_2$CF$_3$)$_2$], Na[N(SO$_2$CF$_3$)$_2$], Ba[N(SO$_2$CF$_3$)$_2$]$_2$, Ca[N(SO$_2$CF$_3$)$_2$]$_2$, and LiPF$_3$(CF$_2$CF$_3$)$_3$.

For example, the semipermeable electrolyte solution storage portion 16 may include a lithium salt and an organic solvent therein. Examples of the lithium salt include at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, LiSbF$_6$, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, LiN(CF$_3$SO$_2$)$_2$, LiPF$_3$(CF$_2$CF$_3$)$_3$, LiPF$_3$(C$_2$F$_5$)$_3$, LiPF$_3$(CF$_3$)$_3$, LiB(C$_2$O$_4$)$_2$, and LiPF$_3$(CF$_2$CF$_3$)$_3$.

The concentration of the alkali metal salt or the alkaline earth metal salt in the semipermeable electrolyte solution storage portion 16 may be in a range of about 1 molar (M) to about 10 M. For example, the concentration of the alkali metal salt or the alkaline earth metal salt in the semipermeable electrolyte solution storage portion 16 may be in a range of about 1 M to about 5 M. The concentration of the alkali metal salt or the alkaline earth metal salt included in the semipermeable electrolyte solution storage portion 16 is greater than a concentration of the alkali metal salt or the alkaline earth metal salt in an electrolyte which is disposed in the electrolyte assembly, which may be in a range of about 1 M to about 1.3 M.

As the semipermeable electrolyte solution storage portion 16 includes the alkali metal salt or the alkaline earth metal salt having a high concentration of the above range, an electrolyte solution (for example, an organic solvent included in the electrolyte solution) may flow in and out of the semipermeable electrolyte solution storage portion 16 due to the osmotic pressure.

The organic solvent may include at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl dioxolane, N,N-dimethylformamide, dimethyl acetamide, dimethyl sulfoxide, dioxane, 1,2-dimethoxyethane, sulfolane, dichloroethane, chlorobenzene, nitrobenzene, diethylene glycol, and dimethyl ether.

The semipermeable electrolyte solution storage portion 16 may further include an osmosis-inducing polymer having a weight average molecular weight of about 300 grams per mole (g/mol) or more or an ionic salt of an alkali metal cation or an alkaline earth metal cation coupled to a counterion thereof at an end of the osmosis-inducing polymer. For example, the semipermeable electrolyte solution storage portion 16 may further include an osmosis-inducing polymer having a weight average molecular weight in a range of about 300 g/mol to about 100,000 g/mol, about 500 g/mol to about 80,000 g/mol, or about 1000 g/mol to about 60,000 g/mol; or an ionic salt of an alkali metal cation or an alkaline earth metal cation coupled to a counterion thereof at an end of the osmosis-inducing polymer.

As used herein, an "osmosis-inducing polymer" refers to a polymer that induces osmotic pressure.

The osmosis-inducing polymer may include at least one polymer selected from polyacrylonitrile, polyacrylic acid (PAA), polyacrylate, polymethyl methacrylate, polyethyleneimide, cellulose acetate, cellulose triacetate, polyvinylpyrrolidone, polyethylene glycol, polyethylene oxide, polyvinyl acetate, and a copolymer thereof. The osmosis-inducing polymer may be an ionic material having a greater molecular weight than a material that may permeate the semipermeable electrolyte solution storage portion 16. Accordingly, when the semipermeable electrolyte solution storage portion 16 includes the osmosis-inducing polymer, and osmotic pressure may easily occur in the semipermeable electrolyte solution storage portion 16.

The semipermeable electrolyte solution storage portion 16 may further include an ionic liquid having an average molecular weight of about 300 g/mol or more. The ionic liquid may have an average molecular weight, for example, in a range of about 300 g/mol to about 800 g/mol.

The ionic liquid may further include at least one selected from an imidazolium cation and a pyrrolidinium cation, and at least one selected from a fluorosulfonyl imide anion, a trifluoromethanesulfonyl imide anion, and a bis(trifluoromethanesulfonyl) imide anion.

For example, the ionic liquid may include at least one selected from a 1,3-dimethyl imidazolium cation, a 1-(2-hydroxyethyl)-3-methyl imidazolium cation, a 1-(3-hydroxypropyl)-3-methyl imidazolium cation, a 1-(4-sulfobutyl)-3-methyl imidazolium cation, a 1-butyl-1-methyl pyrrolidinium cation, a 1-ethyl-1-methyl pyrrolidinium cation, an N-propyl-N-methyl pyrrolidinium cation, and a 1-butyl-2,3-dimethyl imidazolium cation and at least one selected from a fluorosulfonyl imide anion, a trifluoromethane sulfonyl imide anion, and a bis(trifluoromethanesulfonyl) imide anion.

The ionic liquid may be a material having a greater molecular weight than a material that may permeate the semipermeable electrolyte solution storage portion 16. Accordingly, when the semipermeable electrolyte solution storage portion 16 includes the ionic liquid, the semipermeable electrolyte solution storage portion 16 may additionally obtain thermal stability property.

Figure 5:
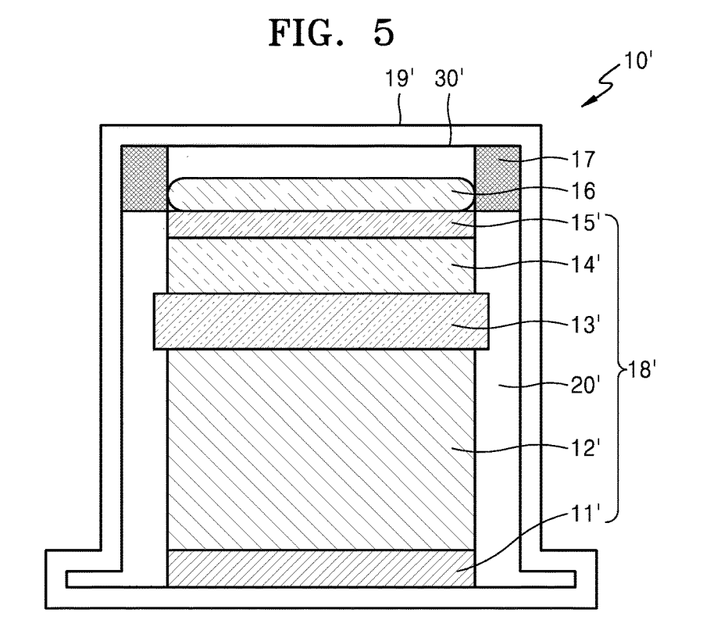
FIG. 5 illustrates a cross-sectional view of the secondary battery illustrated in FIG. 4, further including a guide member at each side of the semipermeable electrolyte solution storage portion.

FIG. 5 illustrates a cross-sectional view of the secondary battery illustrated in FIG. 4, further including a guide member at each side of the semipermeable electrolyte solution storage portion.

Referring to FIG. 5, the guide member 17 may be disposed between both sides of the semipermeable electrolyte solution storage portion 16 and the accommodation portion 30' illustrated in FIG. 4.

The guide member 17 may include at least one polymer selected from polyurethane, polyvinyl acetate, polyacrylate, and polymethyl methacrylate. The polymer material may have excellent elasticity and adhesiveness, and thus, may help the semipermeable electrolyte solution storage portion 16 to be fixed at the selected position. Further, the polymer material may have excellent durability although there may be variable volume changes of the semipermeable electrolyte solution storage portion 16.

In the secondary battery 10', location of the semipermeable electrolyte solution storage portion 16 may be fixed due to the guide member 17.

The first electrodes 11' and 12' may be positive electrodes including a positive active material layer capable of intercalation/deintercalation of lithium ions. The first electrodes 11' and 12' may be positive electrodes including a positive active material layer 12' capable of intercalation/deintercalation of lithium ions on a current collector 11'.

The first electrodes 11' and 12' may be prepared by using the positive active material capable of intercalation/deintercalation of lithium ions, the solvent, and optionally, a binder and/or a conductive agent. The amounts of the positive active material, the conductive agent, the binder, and the solvent used in the manufacture of the battery can be determined by one of skill in the art without undue extermination and thus such further detail is omitted for clarity.

The first electrodes 11' and 12' may be prepared by coating the current collector 11' with the positive active material composition and drying. In some embodiments, the positive active material composition may be cast on a support to form a positive active material layer, which may then be separated from the support and laminated on a metallic current collector to form the first electrodes 11' and 12'. If desired, a plasticizer may further be added to the positive active material composition and/or the negative active material composition to form pores inside the first electrodes 11' and 12'.

Examples of the current collector 11' of the positive electrode include a carbonaceous material, such as activated carbon fiber and/or a metal, such as at least one selected from nickel, aluminum, zinc, titanium, copper, gold, silver, platinum, an aluminum alloy, and stainless steel. The current collector can be formed by plasma spraying or arc spraying, for example, activated carbon fiber, nickel, aluminum, zinc, copper, tin, lead, or an alloy thereof. The current collector may be a conductive film formed by dispersing a conductive agent in resin, such as a rubber or styrene-ethylene-butylene-styrene (SEBS) copolymer. For example, the current collector may include aluminum, nickel, or stainless steel. The current collector may be formed of aluminum that is easily processable into a thin film at low cost. The current collector may have any of a variety shapes, for example, a thin film shape, a flat-plate shape, a mesh shape, a net shape, a punched shape, an embossed shape, or a combination thereof (for example, a meshed flat-plate shape). For example, the current collector may have an uneven surface through etching.

The positive active material capable of intercalation/deintercalation of lithium ions may include at least one selected from a metal oxide, a metal complex oxide, a lithium metal oxide, a lithium metal complex oxide, a carbonaceous material, silicon, a silicon oxide, tin, and a tin oxide.

Examples of the metal oxide may include a transition metal oxide. Examples of the metal complex oxide may include a complex oxide of the transition metal oxide and a metal or metalloid selected from Group 1, Group 2, Group 13, and Group 14 of the periodic table. Examples of the lithium metal oxide may include a lithium transition metal oxide.

Examples of the lithium metal oxide and the lithium metal complex oxide may include one of the compounds represented by the following formulae: $Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2GbO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

Detailed examples of the lithium metal oxide and the lithium metal complex oxide may include at least one compound selected from the following formulae: $Li_xCoO_2$ (where $0.5 < x < 1.3$), $Li_xNiO_2$ (where $0.5 < x < 1.3$), $Li_xMnO_2$ (where $0.5 < x < 1.3$), $Li_xMn_2O_4$ (where $0.5 < x < 1.3$), $Li_x(Ni_aCo_bMn_c)O_2$ (where $0.5 < x < 1.3$, $0 < a < 1$, $0 < b < 1$, $0 < c < 1$, and $a+b+c=1$), $Li_xNi_{1-y}Co_yO_2$ (where $0.5 < x < 1.3$, and $0 < y < 1$), $Li_xCo_{1-y}Mn_yO_2$ (where $0.5 < x < 1.3$, and $0 \leq y < 1$), $Li_xNi_{1-y}Mn_yO_2$ (where $0.5 < x < 1.3$, and $0 \leq y < 1$), $Li_x(Ni_aCo_bMn_c)O_4$ (where $0.5 < x < 1.3$, $0 < a < 2$, $0 < b < 2$, $0 < c < 2$, and $a+b+c=2$), $Li_xMn_{2-z}Ni_zO_4$ (where $0.5 < x < 1.3$, and $0 < z < 2$), $Li_xMn_{2-z}Co_zO_4$ (where $0.5 < x < 1.3$, and $0 < z < 2$), $Li_xCoPO_4$ (where $0.5 < x < 1.3$), and $Li_xFePO_4$ (where $0.5 < x < 1.3$). The lithium metal oxide and the lithium metal complex oxide may be coated with a metal e.g., aluminum (Al) or a metal oxide. In some embodiments, if desired, the positive active material capable of intercalation/deintercalation of lithium ions may further include the lithium metal oxide blended with sulfide, selenide, and/or halide.

Examples of the silicon, the silicon oxide, the tin, and the tin oxide may include Si, $SiO_x$ (where $0 < x < 2$, for example, 0.5 to 1.5), Sn, and $SnO_2$. In some embodiments, at least one selected from a silicon containing metal alloy and a mixture thereof may be used. The silicon containing metal alloy may include at least one metal selected from Al, Sn, Ag, Fe, Bi, Mg, Zn, in, Ge, Pb, and Ti. In some embodiments, the silicon, the silicon oxide, the tin, and the tin oxide may include a metal or metalloid alloyable with lithium, an alloy thereof, or an oxide thereof. For example, the metal or metalloid alloyable with lithium may be Si, Sn, Al, Ge, Pb, Bi, SbSi—Y' alloy (where Y' may be an alkali metal, an alkali earth metal, Group 13 elements, Group 14 elements, a transition metal, a rare earth element or a combination thereof, except for Si), Sn—Y' alloy (where Y' may be an alkali metal, an alkaline earth metal, Group 13 elements, Group 14 elements, a transition metal, a rare earth element or a combination thereof, except for Sn), or MnO (where $0 < x \leq 2$). Each Y' may independently be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po. For example, an oxide of the metal or metalloid alloyable with lithium may be a lithium titanium oxide, a vanadium oxide, a lithium vanadium oxide, $SnO_2$, or $SiO_x$ ($0<x<2$).

Non-limiting examples of the solvent are N-methyl-pyrrolidone (NMP), acetone, and water. Any suitable material available as a solvent in the art may be used.

Examples of the binder may include a vinylidene fluoride/hexafluoropropylene copolymer, polyvinylidene difluoride (PVDF), polyacrylonitrile, polymethyl methacrylate, polytetrafluoroethylene (PTFE), mixtures of these polymers, or a styrene butadiene rubber polymer.

Examples of the binder include a polysaccharide or a derivative thereof, for example, at least one selected from starch, methyl cellulose, carboxymethyl cellulose, hydroxymethyl cellulose, hydroxyethyl cellulose, hydroxypropyl cellulose, carboxymethyl hydroxyethyl cellulose, or nitrocellulose; phenol resin; melamine resin; polyurethane resin; urea resin; polyamide resin; polyimide resin; polyamideimide resin; petroleum pitch; and coal pitch. A plurality of binders may be used as a binder. The binder may serve as a thickening agent in an electrode mixture.

Non-limiting examples of the conducting agent include at least one selected from carbon black, graphite particulates, natural graphite, artificial graphite, acetylene black, Ketjen black, carbon fibers, metallic materials, such as copper, nickel, aluminum, silver, and the like, in powder, fiber, or tube form, and a conductive polymer such as a polyphenylene derivative. Any suitable conducting agent available in the art may be used.

The second electrodes 14' and 15' may be negative electrodes including a lithium metal or an alloy thereof. The second electrodes 14' and 15' include a lithium metal or an alloy of the lithium metal 15' on a current collector 14'.

The current collector 14' may be any suitable current collector, not limited to a material, shape, or manufacturing method thereof. For example, the current collector may be a copper foil having a thickness of about 10 μm to about 100 μm, a punched copper foil having a thickness of about 10 μm to about 100 μm and a hole diameter of about 0.1 mm to about 10 mm, an expandable metal, or a foamed metal plate. The current collector of the negative electrode may be formed of copper, stainless steel, titanium, or nickel.

Examples of the alloy of the lithium metal may include Si, Sn, Al, Ge, Pb, Bi, SbSi—Y' alloy (where Y' may be an alkali metal, an alkali earth metal, Group 13 elements, Group 14 elements, a transition metal, a rare earth element or a combination thereof, except for Si), Sn—Y' alloy (where Y' may be an alkali metal, an alkali earth metal, Group 13 elements, Group 14 elements, a transition metal, a rare earth element or a combination thereof, except for Sn), or $MnO_x$ (where $0<x≤2$). Each Y' may independently be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, and Po. In some embodiments, the second electrodes 14' and 15' may further include an oxide alloyable with the lithium metal. Examples of the oxide alloyable with the lithium metal may include a lithium titanium oxide, a vanadium oxide, a lithium vanadium oxide, $SnO_2$, and $SiO_x$ (where $0<x<2$).

The separator 13' may be an insulating thin film having a high ion permeability and mechanical strength. The diameter of the separator 13' may be in a range of about 0.01 μm to about 10 μm, and the thickness of the separator 13' may be in a range of about 5 μm to about 20 μm. Examples of the separator 13' may include an olefin-based polymer e.g., polypropylene and a sheet or a nonwoven fabric including glass fiber or polyethylene.

Detailed examples of the separator 13' may include polyethylene, polypropylene, polyvinylidene fluoride, and a multilayer film of two or more layers thereof, such as a mixture multilayer film, e.g., a polyethylene/polypropylene two layered separator, a polyethylene/polypropylene/polyethylene three-layered separator, and a polypropylene/polyethylene/polypropylene three-layered separator.

In some embodiments, the separator 13' may be prepared following the method below:

A polymer resin, a filler, and a solvent may be mixed together to prepare a separator composition. The separator composition may be directly coated on the second electrodes 14' and 15', and then dried to form the separator. Alternatively, the separator composition may be cast on a support and then dried to form a separator film, which may then be separated from the support and laminated on the second electrodes 14' and 15' to form the separator.

The polymer resin used for manufacturing the separator may be any suitable material that is used as a binder for electrodes. Examples of the polymer resin include a vinylidene fluoride/hexafluoropropylene copolymer, polyvinylidene fluoride (PVDF), polyacrylonitrile, polymethyl methacrylate and a mixture thereof.

Figure 6:
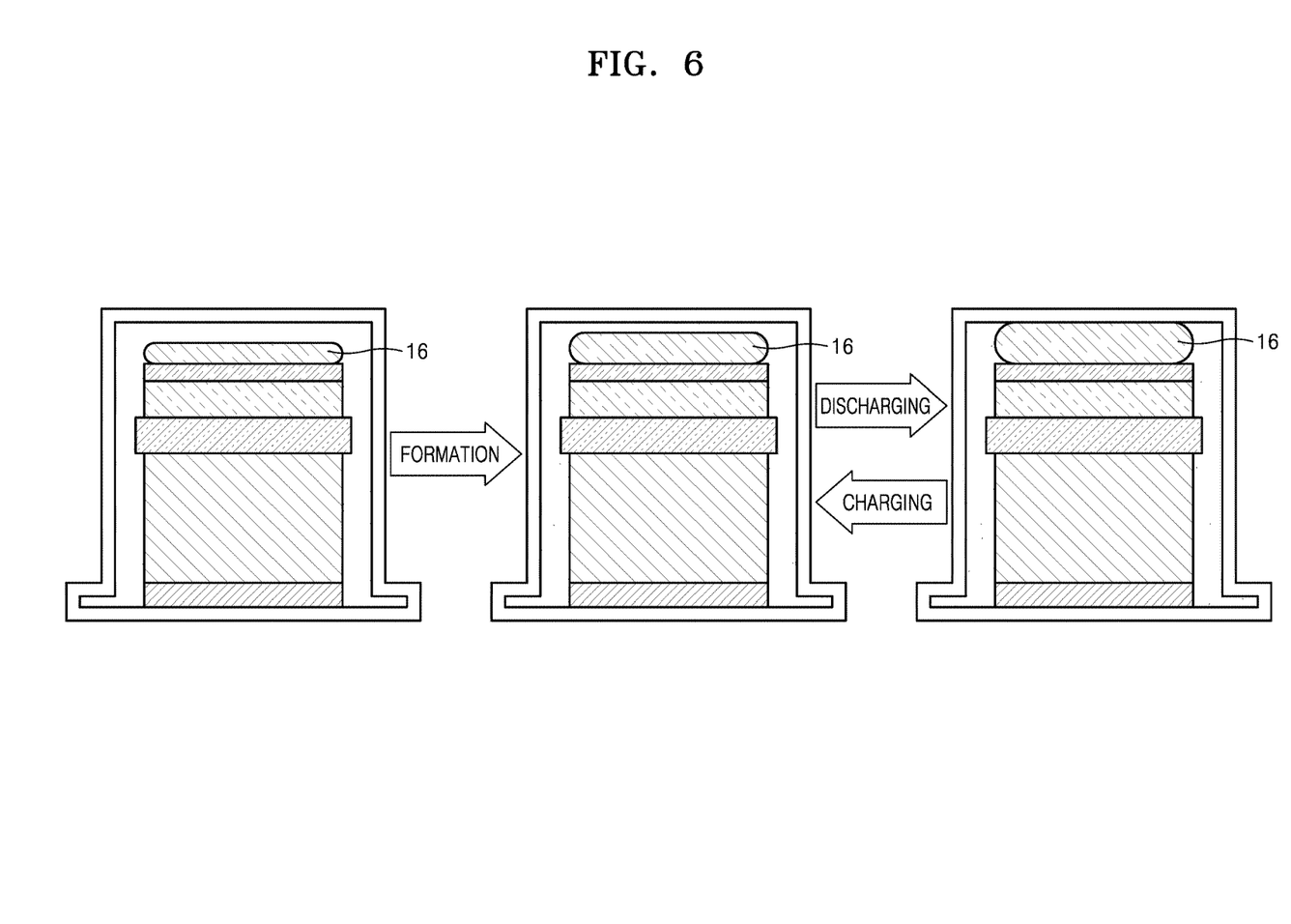
FIG. 6 is a cross-sectional view of a secondary battery according to an exemplary embodiment, illustrating changes of the thickness of an electrode and changes of the thickness of the semipermeable electrolyte solution storage portion, during a formation process and charging and discharging process.

FIG. 6 is a cross-sectional view of the secondary battery according to an exemplary embodiment, illustrating changes of the thickness of a negative electrode and changes of the thickness of the semipermeable electrolyte solution storage portion 16 in and out of which an electrolyte solution flows, during a formation process and charging and discharging process. The electrolyte solution may flow between the semipermeable electrolyte solution storage portion 16 and the electrode assembly.

Referring to FIG. 6, in the secondary battery according to an exemplary embodiment, flow of an electrolyte solution (particularly, an organic solvent included in an electrolyte solution) into the semipermeable electrolyte solution storage portion 16 and flow of the electrolyte solution (particularly, the organic solvent included in the electrolyte solution) out the semipermeable electrolyte solution storage portion 16 may repeatedly occur during the formation process.

When charging the secondary battery, the internal pressure of the semipermeable electrolyte solution storage portion 16 may be greater than the osmotic pressure of the semipermeable electrolyte solution storage portion 16, and thus, the electrolyte solution (particularly, the organic solvent included in the electrolyte solution) may flow out of the semipermeable electrolyte solution storage portion 16.

When discharging the secondary battery, the internal pressure of the semipermeable electrolyte solution storage portion 16 may be smaller than the osmotic pressure of the semipermeable electrolyte solution storage portion 16, and thus, the electrolyte solution (particularly, the organic solvent included in the electrolyte solution) may flow in the semipermeable electrolyte solution storage portion 16.

As the number of the repeated cycles of charging and discharging process, the thickness of the semipermeable electrolyte solution storage portion 16 may increase, thereby gradually increasing the flow of the electrolyte solution (particularly, the organic solvent included in the electrolyte solution) into the semipermeable electrolyte solution storage portion 16.

Also disclosed is a method of manufacturing a secondary battery, the method comprising: disposing an electrode assembly in a case comprising the accommodating portion, wherein the electrode assembly comprises the first electrode, the second electrode, and the separator interposed between the first electrode and the second electrode; and disposing the semipermeable electrolyte solution storage portion adjacent to the electrode assembly in an upper end or a lower end of the accommodation portion to manufacture the secondary battery.

The secondary battery 10' according to an exemplary embodiment may have improved capacity and lifespan characteristics. Thus, the secondary battery 10' may be used not only in a battery cell used as a power in small-sized devices, but also in a battery pack including a plurality of battery cells or a unit battery of a battery module as a power in medium- or large-sized devices.

Examples of the medium- or large-sized devices may include electric cars, e.g., electric vehicles (EVs), hybrid electric vehicles (HEVs), plug-in hybrid electric vehicles (PHEVs), electric two-wheeled vehicles, e.g., E-bikes and E-scooters, power tools, and power storage systems. However, embodiments are not limited thereto.

As described above, according to one or more embodiment, a secondary battery may prevent volume changes of an electrode and continuously provide an electrolyte solution by including a semipermeable electrolyte solution storage portion in an upper end or a lower end of an accommodation portion accommodating an electrode assembly.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While an exemplary embodiment has been described with reference to the figures, it will be understood by those of ordinary skill in the art that various changes in form and details may be made therein without departing from the spirit and scope as defined by the following claims.

What is claimed is:

1. A secondary battery comprising:
    an electrode assembly comprising a first electrode, a second electrode, and a separator interposed between the first electrode and the second electrode; and
    a case comprising an accommodation portion, wherein the electrode assembly is disposed in the accommodation portion, and
    wherein a semipermeable electrolyte solution storage portion is adjacent to the electrode assembly in an upper end or a lower end of the accommodation portion,
    wherein the semipermeable electrolyte solution storage portion comprises a polymeric material comprising at least one polymer selected from polystyrene, polysulfone, polyvinylidene difluoride, polyacrylonitrile, polycarbonate, polytetrafluoroethylene, and a copolymer thereof.

2. The secondary battery of claim 1, wherein the semipermeable electrolyte solution storage portion has a thickness in a range of about 5% to about 10%, based on a total thickness of the secondary battery.

3. The secondary battery of claim 1, wherein the semipermeable electrolyte solution storage portion has a pore, and wherein the pore has a molecular weight of cutoff in a range of about 300 Daltons to about 5,000 Daltons.

4. The secondary battery of claim 1, wherein the semipermeable electrolyte solution storage portion comprises an alkali metal salt or an alkaline earth metal salt, and an organic solvent.

5. The secondary battery of claim 4, wherein the alkali metal salt or the alkaline earth metal salt is at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, LiSbF$_6$, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, LiN(CF$_3$SO$_2$)$_2$, LiPF$_3$(CF$_2$CF$_3$)$_3$, LiPF$_3$(C$_2$F$_5$)$_3$, LiPF$_3$(CF$_3$)$_3$, LiB(C$_2$O$_4$)$_2$, NaSCN, NaSO$_3$CF$_3$, K[N(SO$_2$CF$_3$)$_2$], Na[N(SO$_2$CF$_3$)$_2$], Ba[N(SO$_2$CF$_3$)$_2$]$_2$, Ca[N(SO$_2$CF$_3$)$_2$]$_2$, and LiPF$_3$(CF$_2$CF$_3$)$_3$.

6. The secondary battery of claim 4, wherein a concentration of the alkali metal salt or the alkaline earth metal salt is in a range of about 1 molar to about 10 molar.

7. The secondary battery of claim 4, wherein the organic solvent comprises at least one selected from propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl dioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, and dimethyl ether.

8. The secondary battery of claim 1, wherein the semipermeable electrolyte solution storage portion further comprises an osmosis-inducing polymer having a weight average molecular weight of about 300 grams per mole or more or a salt comprising an alkali metal cation or an alkaline earth metal cation coupled to a counterion thereof at an end of the osmosis-inducing polymer.

9. The secondary battery of claim 8, wherein the osmosis-inducing polymer comprises at least one polymer selected from polyacrylonitrile, polyacrylic acid, polyacrylate, polymethyl methacrylate, polyethylene imide, cellulose acetate, cellulose triacetate, polyvinylpyrrolidone, polyethylene glycol, polyethylene oxide, polyvinyl acetate, and a copolymer thereof.

10. The secondary battery of claim 1, wherein the semipermeable electrolyte solution storage portion further comprises an ionic liquid having an average molecular weight of about 300 grams per mole or more.

11. The secondary battery of claim 10, wherein the ionic liquid further comprises
    at least one selected from an imidazolium cation and a pyrrolidinium cation, and
    at least one selected from a fluorosulfonyl imide anion, a trifluoromethanesulfonyl imide anion, and a bis(trifluoromethanesulfonyl) imide anion.

12. The secondary battery of claim 1, further comprising a guide member at each side of the semipermeable electrolyte solution storage portion.

13. The secondary battery of claim 12, wherein the guide member comprises at least one polymer selected from polyurethane, polyvinyl acetate, polyacrylate, and polymethyl methacrylate.

14. The secondary battery of claim 12, wherein the semipermeable electrolyte solution storage portion is fixedly disposed by the guide member.

15. The secondary battery of claim 1, wherein the first electrode comprises a positive electrode comprising a positive active material capable of intercalation and deintercalation of lithium ions.

16. The secondary battery of claim 1, wherein the second electrode comprises a negative electrode comprising at least one selected from lithium metal and an alloy thereof.

17. A method of operating a secondary battery comprising
an electrode assembly comprising a first electrode, a second electrode, and a separator interposed between the first electrode and the second electrode,
an electrolyte disposed in the electrode assembly, and
a case comprising an accommodation portion, wherein the electrode assembly is disposed in the accommodation portion, and wherein a semipermeable electrolyte solution storage portion is adjacent to the electrode assembly in an upper end or a lower end of the accommodation portion, the method comprising:
charging the secondary battery, wherein, when charging the secondary battery, an internal pressure of the semipermeable electrolyte solution storage portion is greater than an osmotic pressure of the semipermeable electrolyte solution storage portion, and
wherein the electrolyte solution flows out of the semipermeable electrolyte solution storage portion during the charging.

18. The method of claim 17, further comprising discharging the secondary battery, wherein, when discharging the secondary battery, the internal pressure of the semipermeable electrolyte solution storage portion is less than the osmotic pressure of the semipermeable electrolyte solution storage portion, and the electrolyte solution flows into the semipermeable electrolyte solution storage portion.

19. A method of manufacturing a secondary battery, the method comprising:
disposing an electrode assembly in a case comprising an accommodating portion, wherein the electrode assembly comprises a first electrode, a second electrode, and a separator interposed between the first electrode and the second electrode; and
disposing a semipermeable electrolyte solution storage portion adjacent to the electrode assembly in an upper end or a lower end of the accommodation portion to manufacture the secondary battery,
wherein the semipermeable electrolyte solution storage portion comprises a polymeric material comprising at least one polymer selected from polystyrene, polysulfone, polyvinylidene difluoride, polyacrylonitrile, polycarbonate, polytetrafluoroethylene, and a copolymer thereof.

* * * * *

UNITED STATES PATENT AND TRADEMARK OFFICE
CERTIFICATE OF CORRECTION

PATENT NO. : 10,236,536 B2
APPLICATION NO. : 15/132626
DATED : March 19, 2019
INVENTOR(S) : Jaeeun Kim et al.

Page 1 of 1

It is certified that error appears in the above-identified patent and that said Letters Patent is hereby corrected as shown below:

In the Claims

Column 13, Line 66, Please correct Claim 3 by removing "of" between "weight" and "cutoff"

Signed and Sealed this
Fourteenth Day of April, 2020

Andrei Iancu
*Director of the United States Patent and Trademark Office*